(12) United States Patent  (10) Patent No.: US 8,897,973 B2
Hunt et al.  (45) Date of Patent: *Nov. 25, 2014

(54) SYSTEM AND METHOD FOR COLLECTING AND PROCESSING AGRICULTURAL FIELD DATA

(71) Applicant: AgJunction LLC, Hiawatha, KS (US)

(72) Inventors: Aaron Dale Hunt, Bellefonte, PA (US); Jeffrey Allen Dearborn, Southaven, MS (US)

(73) Assignee: AgJunction LLC, Hiawatha, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/011,347

(22) Filed: Aug. 27, 2013

(65) Prior Publication Data

US 2013/0346129 A1  Dec. 26, 2013

Related U.S. Application Data

(63) Continuation of application No. 13/117,794, filed on May 27, 2011, now Pat. No. 8,521,372.

(60) Provisional application No. 61/349,695, filed on May 28, 2010, provisional application No. 61/349,707, filed on May 28, 2010, provisional application No. 61/349,703, filed on May 28, 2010.

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *G06Q 10/06* | (2012.01) |
| *G06Q 50/02* | (2012.01) |
| *G06Q 10/00* | (2012.01) |

(52) U.S. Cl.
CPC ........ *G06Q 50/02* (2013.01); *G06Q 10/063114* (2013.01); *G06Q 10/06311* (2013.01); *G06Q 10/00* (2013.01)
USPC .......................... 701/50; 701/1; 701/2; 702/2

(58) Field of Classification Search
CPC .............. G06Q 50/02; G06Q 10/0631; G06Q 10/06311; G06Q 10/063114
USPC ........ 701/1, 2, 50; 702/2, 3, 5, 20, 22, 30, 72, 702/76; 705/3, 7.11, 7.13, 7.15, 73
See application file for complete search history.

(56) References Cited

U.S. PATENT DOCUMENTS 6,016,713 A * 1/2000 Hale .......................... 73/864.45
6,044,324 A * 3/2000 Boerhave et al. ................. 702/5

(Continued)

FOREIGN PATENT DOCUMENTS

WO  WO-0004341  1/2000

OTHER PUBLICATIONS

"International Search Report", PCT/US2011/038378, (Nov. 29, 2011).

(Continued)

*Primary Examiner* — Jason Holloway
*Assistant Examiner* — Rachid Bendidi
(74) *Attorney, Agent, or Firm* — Law Office of Mark Brown, LLC; Mark E. Brown; Christopher M. DeBacker

(57) ABSTRACT

A system and method for managing the collection and processing of agricultural field data from a single location is provided. The system includes functionality to create workorders for the taking of samples at a predetermined location, transmit the sampling workorders to the equipment or operators at a job site, e.g., an agricultural field, and log the results of a completed sampling workorder. The system also includes functionality to transmit log data related to the taken samples to a laboratory and receive analysis information on the taken samples from the laboratory. The system then combines log data and analysis information on the taken samples for use in determining additional actions at the predetermined location.

1 Claim, 6 Drawing Sheets

(56) References Cited

U.S. PATENT DOCUMENTS

| | | | |
|---|---|---|---|
| 6,141,614 A * | 10/2000 | Janzen et al. | 701/50 |
| 6,336,066 B1 | 1/2002 | Pellenc et al. | |
| 6,553,300 B2 | 4/2003 | Ma et al. | |
| 6,606,542 B2 | 8/2003 | Hauwiller et al. | |
| 6,937,939 B1 * | 8/2005 | Shibusawa et al. | 702/22 |
| 6,959,245 B2 * | 10/2005 | Rooney et al. | 702/5 |
| 7,059,275 B2 * | 6/2006 | Laitinen et al. | 119/720 |
| 7,110,881 B2 | 9/2006 | Gray et al. | |
| 7,184,859 B2 * | 2/2007 | Hood et al. | 700/284 |
| 7,254,485 B2 | 8/2007 | Rooney et al. | |
| 7,343,867 B2 * | 3/2008 | Fraisse et al. | 111/118 |
| 7,552,654 B2 * | 6/2009 | Burton | 73/864.45 |
| 7,742,862 B2 * | 6/2010 | Anderson et al. | 701/50 |
| 7,908,062 B2 * | 3/2011 | Corcoran | 701/50 |
| 7,930,085 B2 | 4/2011 | Anderson et al. | |
| 8,260,485 B1 | 9/2012 | Meuth et al. | |
| 2002/0035431 A1 * | 3/2002 | Ell | 702/5 |
| 2003/0208319 A1 * | 11/2003 | Ell et al. | 702/5 |
| 2004/0006426 A1 | 1/2004 | Armstrong et al. | |
| 2005/0150160 A1 | 7/2005 | Norgaard et al. | |
| 2007/0233533 A1 * | 10/2007 | Xie et al. | 705/7 |
| 2009/0005990 A1 * | 1/2009 | Anderson et al. | 702/2 |
| 2009/0216594 A1 | 8/2009 | Verhey et al. | |
| 2010/0036696 A1 * | 2/2010 | Lang et al. | 705/7 |
| 2011/0176523 A1 | 7/2011 | Huang et al. | |
| 2011/0240730 A1 * | 10/2011 | Covely | 235/375 |
| 2012/0013498 A1 | 1/2012 | Hilliard et al. | |
| 2012/0014220 A1 | 1/2012 | DePasqua | |
| 2012/0015566 A1 | 1/2012 | Salmon | |
| 2012/0015625 A1 | 1/2012 | Mendenhall et al. | |
| 2012/0015670 A1 | 1/2012 | Boyer et al. | |
| 2012/0015671 A1 | 1/2012 | Lada | |
| 2012/0016696 A1 | 1/2012 | Lee | |
| 2012/0019412 A1 | 1/2012 | Manzen et al. | |
| 2012/0019641 A1 | 1/2012 | Reeder, III | |
| 2012/0021385 A1 | 1/2012 | Belenkii et al. | |
| 2012/0021728 A1 | 1/2012 | Davis | |
| 2012/0023333 A1 | 1/2012 | Takada et al. | |
| 2012/0024181 A1 | 2/2012 | Von Lengeling et al. | |
| 2012/0027190 A1 | 2/2012 | Kim et al. | |
| 2012/0028586 A1 | 2/2012 | Inaba | |
| 2012/0028599 A1 | 2/2012 | Hatton et al. | |
| 2012/0029759 A1 | 2/2012 | Suh et al. | |
| 2012/0029764 A1 | 2/2012 | Payne et al. | |
| 2012/0029825 A1 | 2/2012 | Cho et al. | |
| 2012/0029936 A1 | 2/2012 | Hanoun | |
| 2012/0032807 A1 | 2/2012 | Schumacher | |
| 2012/0033247 A1 | 2/2012 | Bernardo | |
| 2012/0033473 A1 | 2/2012 | Scharf | |
| 2012/0033580 A1 | 2/2012 | Rudolph et al. | |
| 2012/0033720 A1 | 2/2012 | Brunel et al. | |
| 2012/0256770 A1 | 10/2012 | Mitchell | |
| 2013/0124055 A1 | 5/2013 | Baurer et al. | |
| 2013/0179204 A1 | 7/2013 | Sabarez, II | |
| 2013/0211660 A1 | 8/2013 | Mitchell | |

OTHER PUBLICATIONS

"International Search Report", PCT/US2011/038381, (Aug. 25, 2011).

* cited by examiner

SYSTEM AND METHOD FOR COLLECTING AND PROCESSING AGRICULTURAL FIELD DATA

CROSS-REFERENCE TO RELATED APPLICATIONS

This application in a continuation of and claims the benefit of U.S. patent application Ser. No. 13/117,794, entitled "SYSTEM AND METHOD FOR COLLECTING AND PROCESSING AGRICULTURAL FIELD DATA," filed May 27, 2011, now U.S. Pat. No. 8,521,372, issued Aug. 27, 2013, which claims the benefit of U.S. Provisional Patent Application No. 61/349,703, entitled "SYSTEM AND METHOD FOR COLLECTING AND PROCESSING AGRICULTURAL FIELD DATA," filed May 28, 2010, U.S. Provisional Patent Application No. 61/349,707, entitled "REMOTE MANAGEMENT SYSTEM FOR EQUIPMENT," filed May 28, 2010, and U.S. Provisional Patent Application No. 61/349,695, entitled "SYSTEM AND METHOD FOR WORKORDER MANAGEMENT," filed May 28, 2010, which applications are hereby incorporated by reference in their entirety.

BACKGROUND

The application generally relates to collecting and processing agricultural field data. The application relates more specifically to a system and method for remotely overseeing or controlling the organizing, monitoring, analyzing and collecting of agricultural field data by equipment, people and other assets.

Previously, when a user wanted samples from a particular job site, the user had to create a workorder that provided information on the samples to be taken and then make arrangements for the workorder to be provided to the job site. The user could directly provide the workorder to the equipment operator assigned to the job site, which would require the user and operator to be at the same location. If the user was not at the same location as the operator, the user would have to transmit the information to the operator by phone or other communication technique, which transmission process could be time consuming and lead to errors being introduced into the workorder. Further, once the workorder was completed and the samples were taken, information regarding the samples and the completion of the workorder had to be sent back to the user using the same time consuming and error prone techniques.

Further, after the samples were taken, the operator had to make arrangements to provide the collected samples to a laboratory for analysis. The operator would have to manually prepare associated documentation for the samples as required by the laboratory and include the documentation with the physical samples, which would delay the laboratory's start in processing the samples. Then, once the laboratory completed the analysis of the samples, the laboratory would send a paper report detailing the analysis results. If a user wanted to correlate the analysis results with the information associated with the taking of the samples, the user would have to manually correlate the information, which correlation process can be time consuming and error prone.

Therefore, what is needed is a system and method that can manage the collecting and processing of agricultural field data from a single location including the sending of workorders to collect samples, the providing of samples and associated information to a laboratory for analysis, and the receipt of information from the laboratory regarding analyzed samples.

SUMMARY OF THE INVENTION

The present application is directed to a method for collecting and processing agricultural field data. The method includes collecting a plurality of samples at a predetermined location, storing log data associated with the collected plurality of samples and transmitting the stored log data on the collected plurality of samples to a computer. The method further includes analyzing the collected plurality of samples and transmitting analysis information on the collected plurality of samples to the computer. The method also includes combining the analysis information with the stored log data for the collected plurality of samples with the computer and preparing a prescription plan for the predetermined location using the combined information for the collected plurality of samples.

The present application is additionally directed to a system having a first computer, a second computer associated with a piece of equipment at a remote location from the first computer, a third computer associated with a laboratory, and a field data management system. The field data management system including a first computer algorithm executable by a microprocessor from the first computer, a second computer algorithm executable by a microprocessor from the second computer, and a third computer algorithm executable by a microprocessor from the third computer. The first computer algorithm operates to permit a user to create a sampling workorder for a predetermined location and transmit the sampling workorder to the second computer. The second computer algorithm operates to store log data associated with a collection of samples from the sampling workorder and transmit log data associated with the collection of samples to the first computer and the third computer. The third computer algorithm operates to transmit analysis information relating to the collection of samples to the first computer. The first computer algorithm operates to combine the log data and the analysis information for the collection of samples with respect to the predetermined location.

One advantage of the present application is the ability to determine and save specific information on the location of where a sample is taken.

Another advantage of the present application is significant cost savings in time and resources from more efficient collecting and processing of agricultural field data.

Still another advantage of the present application is the use of mobile communications and web services to enable communication of information to a central system and subsequent access of information from the central system.

An additional advantage of the present application is the ability for users in multiple locations to collaborate on the same document, i.e., a peer-sharing document that is accessible from the beginning of the process to the end of the process.

Another advantage of the present application is more efficient and accurate collection of agricultural field data.

Yet another advantage of the present application is better and more accurate reporting capabilities regarding agricultural field data to comply with governmental requirements.

A further advantage of the present application is a reduction in the misapplication of materials or misuse of machines or equipment and the corresponding liability associated with such misapplication or misuse.

Other features and advantages of the present application will be apparent from the following more detailed description of the preferred embodiment, taken in conjunction with the accompanying drawings which illustrate, by way of example, the principles of the application.

BRIEF DESCRIPTION OF THE DRAWINGS

Wherever possible, the same reference numbers are used throughout the drawings to refer to the same or like parts.

DETAILED DESCRIPTION OF THE PREFERRED EMBODIMENTS

Figure 1:
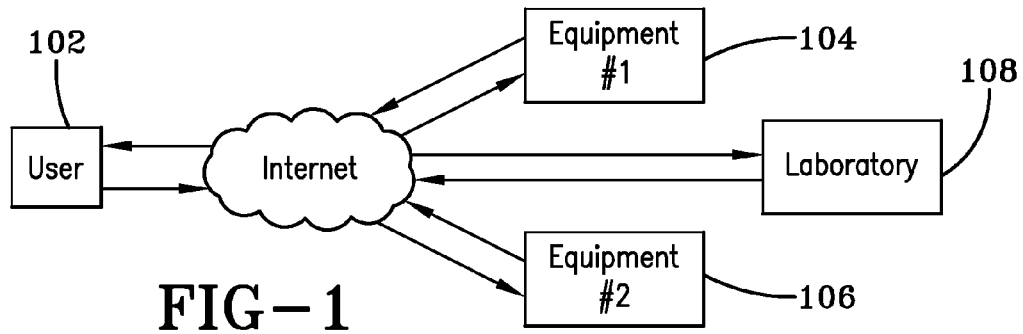
FIG. 1 shows schematically an exemplary embodiment of the transmission of information between a user and multiple pieces of equipment.

The present application is directed to a system and method for coordinating the collecting and processing of agricultural field data from a single location. In an exemplary embodiment, the agricultural field data system can be an "online system" that is accessed by users over the Internet or other similar type of computer network. The use of the Internet or other type of computer network permits the transfer, i.e., the sending and/or receiving, of information between users and/or the pieces of equipment without the users and/or pieces of equipment having to be in close proximity to each other. In addition, since the agricultural field data system uses the Internet to transfer information, users can access the agricultural field data system with any device that includes Internet connection functionality, e.g., network cards, wireless modems, transceivers, etc., and display software, e.g., a web browser. Some examples of devices a user can use to access the agricultural field data system are desktop computers, laptop computers, tablet computers, net books, handheld devices, e.g., "smart" phones, and other similar devices. The user may be required to enter personally identifiable information, e.g., a user name and password, to permit the agricultural field data system to identify the user. Once the user is identified by the agricultural field data system, the agricultural field data system can retrieve a user profile for the user that can include information on particular fields and/or locations for evaluation and treatment, available sampling type(s), available sampling method(s), analytical labs to be used, a window of activity and user preference information. After gaining access to the agricultural field data system, a user is provided with a web page or other similar type of file that provides information on a particular field and/or location selected by a user.

In one exemplary embodiment, the agricultural field data system is used in the agricultural industry to permit a user to monitor and coordinate the collection and processing of agricultural field data. The agricultural field data system can be included in or be a part of a larger agricultural management system. However, in other embodiments, the agricultural field data system can be a stand-alone application that operates separate from other agricultural management systems. If the agricultural field data system is separate from other agricultural management systems, the agricultural field data system can be in communication with the other agricultural management systems to exchange data as required.

In one embodiment, the agricultural field data system can be computer programs, algorithms or software stored in the non-volatile memory of corresponding computers or computing devices accessible by the user or operator or associated with the pieces of equipment or machinery. The computer programs, algorithms or software can have a series of instructions executable by a corresponding microprocessor of the computer or computing device. While the agricultural field data system can be embodied in a computer program(s) and executed by a microprocessor, it will be understood by those skilled in the art that the agricultural field data system may have some functions implemented and executed using digital and/or analog hardware, especially on the computer or computing device associate with the pieces of equipment or machinery. The agricultural field data system also includes user interfaces accessible by the user and the machinery or equipment operators.

FIG. 1 shows an embodiment of the transmission of information between a user, multiple pieces of equipment and/or the corresponding equipment operators, and a laboratory using the agricultural field data system of the present application. In the exemplary embodiment shown in FIG. 1, a user 102 can transmit and receive information regarding agricultural field data with a first piece equipment 104 (or an assigned operator) and a second piece of equipment 106 (or an assigned operator) using a corresponding user computer. The user computer can transmit sampling workorders over the Internet to remote equipment or machinery, i.e., a first sampling workorder can be transmitted to a computer associated with equipment #1 104 (or the assigned operator) and a second sampling workorder can be transmitted to a computer associated with equipment #2 106 (or the assigned operator).

As the corresponding sampling workorders are completed, the corresponding sampling information can be transmitted back to the user 102 by the equipment computer #1 and the equipment computer #2 for review by the user 102. In addition, the equipment computer #1 and the equipment computer #2 wirelessly transmit sampling information to a laboratory 108 along with providing the corresponding physical samples to the laboratory 108 for analysis. In an alternate embodiment, after reviewing the sampling information from the equipment computer #1 and the equipment computer #2, the user 102 can send the sampling information over the Internet to a computer associated with the laboratory 108 for the laboratory's use in analyzing and processing the samples. Once the laboratory 108 has completed the analysis of the samples, the laboratory computer can transmit the results back to the user computer for review by the user 102. In another embodiment, the user computer can send other information, e.g., a prescription plan for a particular field or location, to the equipment computer #1 and the equipment computer #2 and receive corresponding information back from the equipment computer #1 and the equipment computer #2 regarding the execution of the prescription plan.

Figure 2:
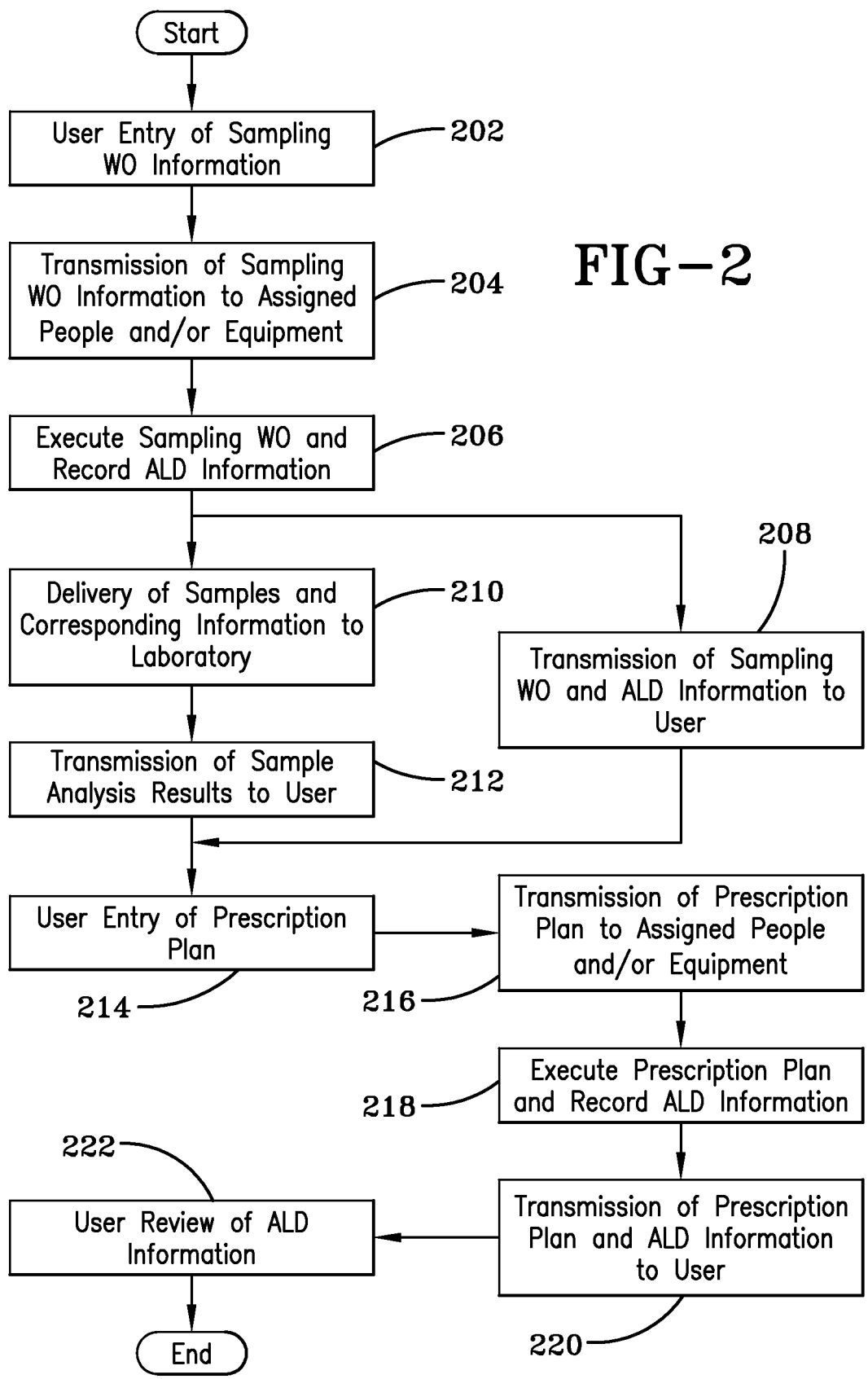
FIG. 2 shows a flowchart of an exemplary embodiment of the process for the evaluation and treatment of a predetermined field or location.

FIG. 2 shows an exemplary embodiment of a process for the evaluation and treatment of a predefined or predetermined agricultural field or location. The process begins by a user entering a sampling workorder (WO) into the system (step 202). When entering a sampling workorder into the system, the user can select: a predetermined or predefined field or location; a predetermined or predefined task or action to be performed at the selected predefined field or location; the corresponding equipment and/or operator to perform the selected predefined task or action at the selected predefined field or location; an analytical lab to be used; and window of activity. The predefined task or action to be performed can include information on the type of samples to be taken and/or the sampling method to be used. In one exemplary embodiment, a user can only create sampling workorders for defined fields or locations as shown on a computer generated/displayed map, i.e., the fields or locations are defined by boundary indicators shown on the computer generated/displayed map. In other words, a user cannot create a sampling workorder for a field or location that does not have a defined boundary on the computer generated/displayed map. If the user wants to create a sampling workorder for a field or location that does not have a defined boundary, the user has to first identify the location of the boundaries for the corresponding field or location on the computer generated/displayed map. Once the field or location has been defined on the computer generated/displayed map, the user can then create a sampling workorder for that field or location.

Figure 3:
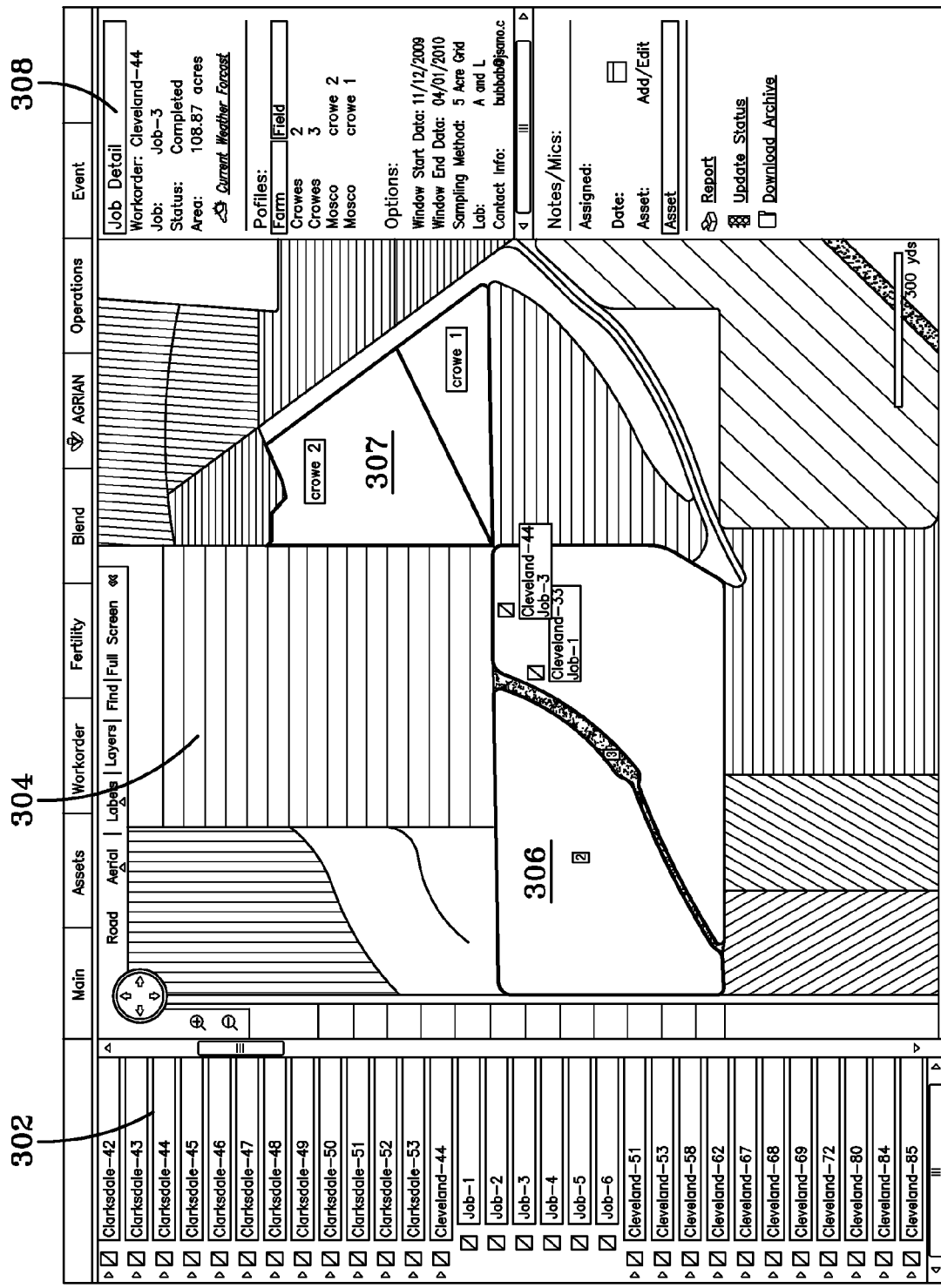
FIG. 3 shows an exemplary embodiment of a web page displaying workorder information for the agricultural field data system.

FIG. 3 shows an exemplary web page, as displayed by a web browser, for the agricultural field data system. A web page 300 can display a list 302 of workorders, including sampling workorders, created or accessible by the user. When a workorder is selected from the list 302, a map 304 can be displayed and predefined fields or locations 306, i.e., fields or locations with defined boundaries, can be shown with respect to the map 304. Information relating to the selected workorder can be displayed in an information field or area 308 and can provide information on the status of the workorder, the predetermined field or location 306 associated with the workorder, and other information associated with the workorder.

Referring back to FIG. 2, after the sampling workorder is entered into the system, the sampling workorder can be stored or saved in the system and then wirelessly transmitted to the corresponding assigned equipment and/or people to perform the required tasks, e.g., collect the sample(s), at the predefined field or location as set forth in the sampling workorder (step 204). In an exemplary embodiment, if the selected equipment and/or operator are not present at the field or location selected by the user for the sampling workorder, the system can also send position information along with the sampling workorder to direct the equipment and/or operator to the proper location. In another embodiment, if the equipment and/or operator are equipped with global positioning system (GPS) devices, the GPS device can be used to guide the equipment and/or operator to the selected field or location.

Once the sampling workorder is received by the corresponding equipment and/or operator, the workorder is stored or saved in a computer included in or with the equipment or operator. In one embodiment, if the sampling workorder is sent to the operator, the operator may have to transfer the sampling workorder to the computer included with the equipment. In another embodiment, if the sampling workorder is sent directly to the computer included with the equipment, the operator may receive a notification, e.g., an email, text message, etc., informing the operator that the equipment computer has received a new sampling workorder.

After the sampling workorder is stored on the equipment computer, the necessary actions from the sampling workorder, e.g., the taking of samples, are performed by the equipment and/or operator (step 206). To facilitate more accurate processing of the sampling workorder, the equipment can include a global positioning system (GPS) device. The GPS device can provide an accurate location of where certain actions identified in the sampling workorder, e.g., the taking of a sample, were taken by the equipment and/or operator.

Figure 4:
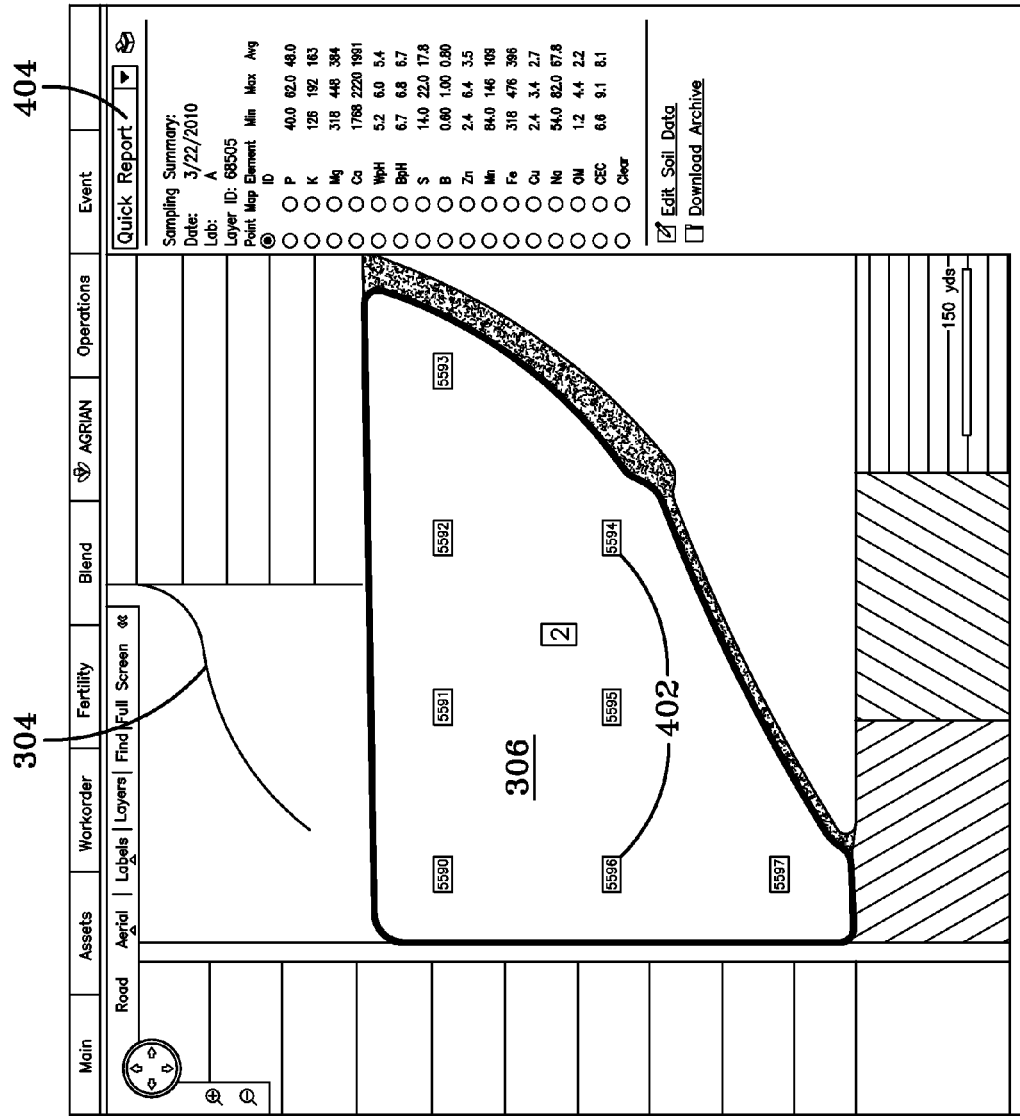
FIG. 4 shows an exemplary embodiment of a web page displaying sample information for the agricultural field data system.

FIG. 4 shows an exemplary web page, as displayed by a web browser, for the agricultural field data system. A web page 400 can display a map 304 with the predefined field or location 306 identifying the samples from the sampling workorder. The requested samples are shown by indicators 402 relative to the map 304 and predefined field or location 306. Depending on the status of the sampling workorder, the indicators 402 can show where samples are to be taken or where samples were taken by the equipment and/or operator. Information relating to the samples can be displayed in an information field or area 404. Again, depending on the status of the sampling workorder, the information field 404 can either display information regarding the taking of the samples or information regarding the subsequent collection and analysis of the samples, such as the soil composition of the samples.

Referring back to FIG. 2, after the required actions from the sampling workorder have been completed in accordance with the sampling workorder, the equipment and/or operator can then wirelessly send or transmit the completed sampling workorder and associated data or application log data (ALD) back to the system for access by the user (step 208). The system stores the information returned from the equipment and/or operator with the original sampling workorder.

Figure 5:
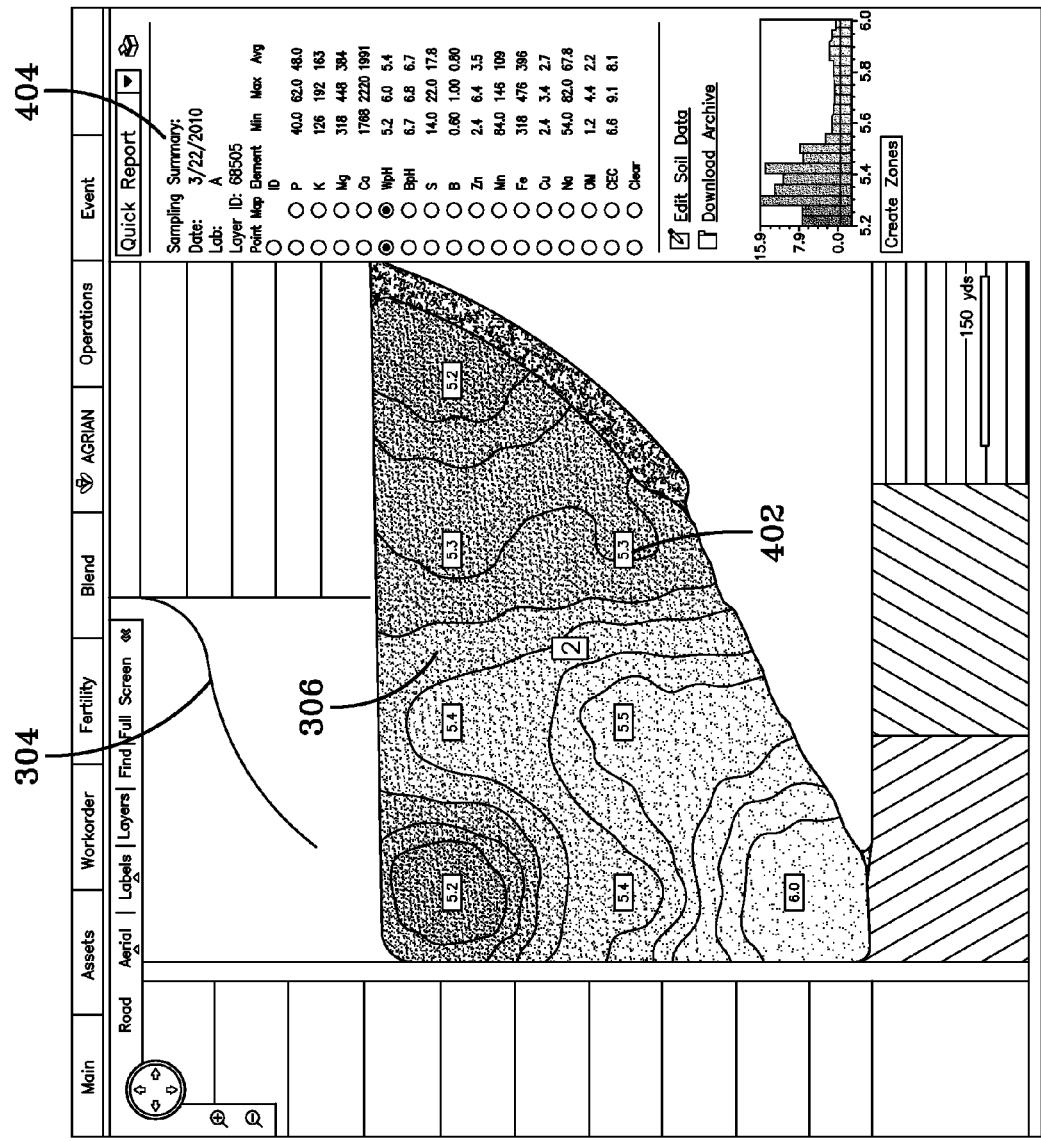
FIG. 5 shows an exemplary embodiment of a web page displaying combined sample data and laboratory results for the agricultural field data system.
Figure 6:
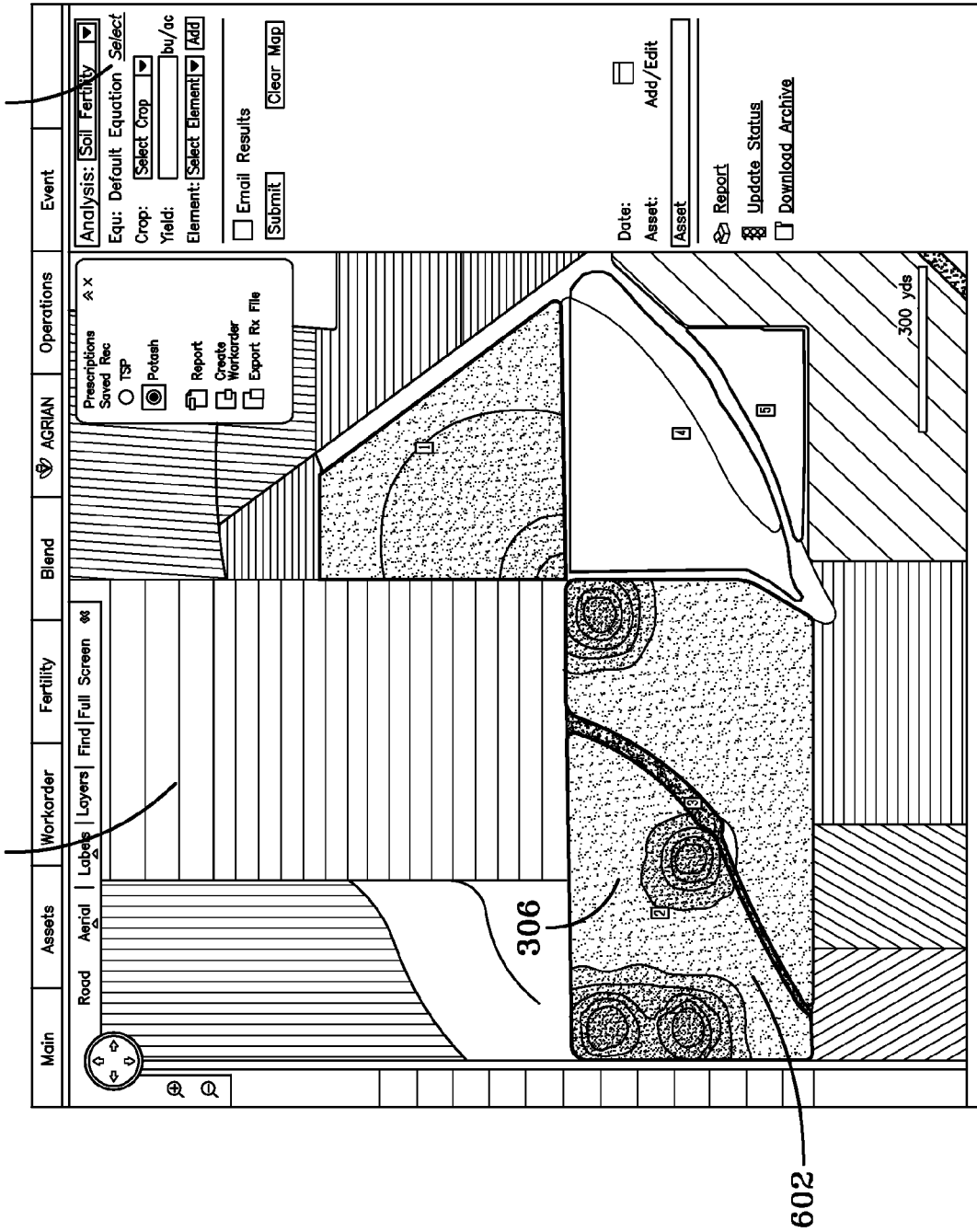
FIG. 6 shows an exemplary embodiment of a web page displaying a recommendation plan or prescription for the agricultural field data system.

In addition, the equipment and/or operator also wirelessly sends or transmits information relating to the collected samples to the corresponding laboratory that is to process the samples to enable the laboratory to "check in" the samples and the operator provides or sends the actual samples to the laboratory for analysis (step 210). The laboratory analyzes the samples and provides the results of the analysis to the system for access by the user (step 212). The system then incorporates the results of the sample analysis from the laboratory with the original sample data sent to the system by the equipment and/or the operator. FIG. 5 shows an exemplary web page, as displayed by a web browser, with combined sample data and laboratory results. Next, a user can access the combined sample data and laboratory results from the system and can make a recommendation plan or prescription for the predefined field or location (step 214). FIG. 6 shows an exemplary web page, as displayed by a web browser, with a recommendation plan or prescription for the location selected by a user. The recommendation plan or prescription can be stored in the system and then wirelessly transmitted along with a corresponding prescription plan workorder to the corresponding equipment and/or operator at the predefined field or location (step 216). The prescription or recommendation plan for the piece of equipment configures the piece of equipment to apply certain materials in certain amounts in certain areas.

Figure 7:
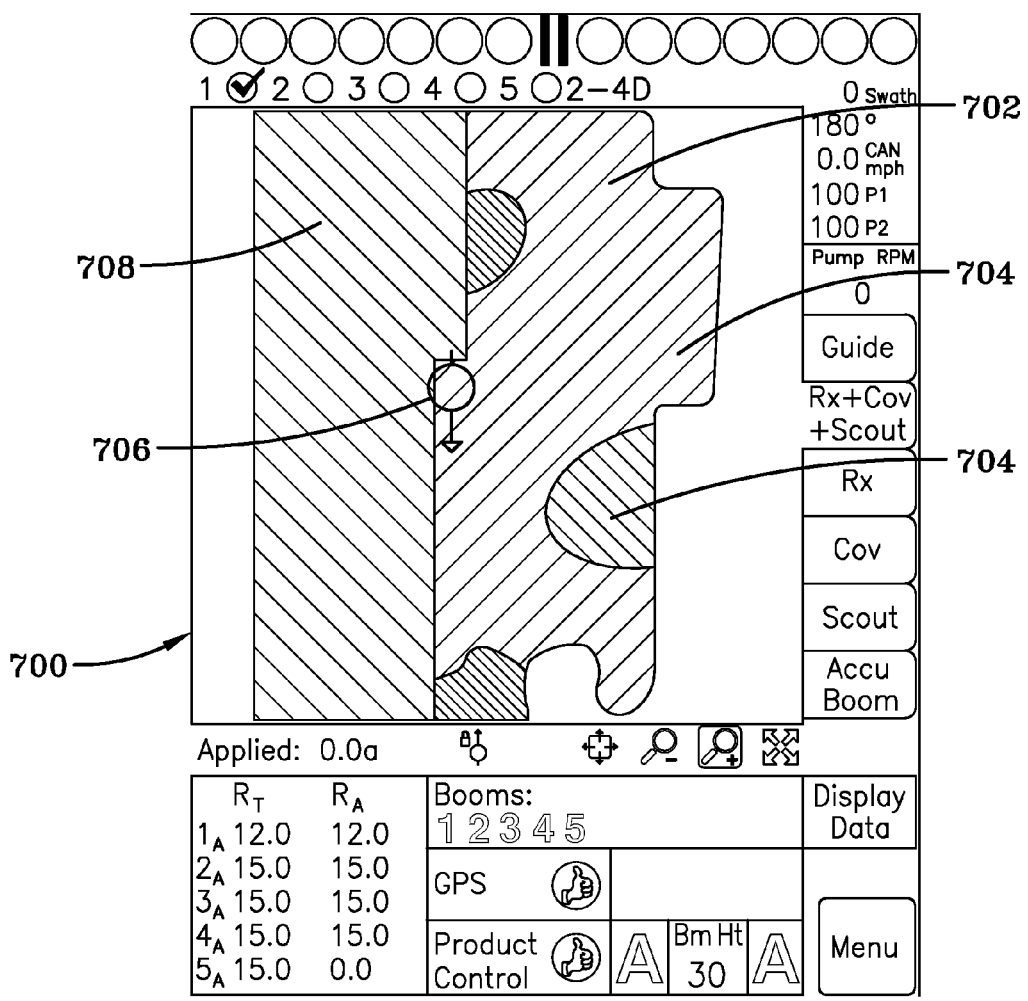
FIG. 7 shows an exemplary embodiment of a web page displaying the progress of a piece of equipment in completing a prescription plan.

After the prescription plan workorder is stored on the equipment computer, the necessary actions from the prescription plan workorder are performed by the equipment and operator (step 218). The system can also track the progress of the piece of equipment with respect to the particular prescription. FIG. 7 shows an exemplary web page, as displayed by a web browser, for the tracking of the progress of a piece of equipment relative to a prescription plan. When the piece of equipment and/or operator has finished with the application of materials in accordance with the prescription or recommendation plan, the piece of equipment and/or operator can wirelessly send application log data, e.g., the amount of material actually applied, and completed prescription plan workorder information to the system for access by a user (step 220). Finally, a user can access and download the log data reports pertaining to the location selected by a user (step 222).

In FIG. 5, a web page 500 can display a map 304 with the predefined field or location 306 showing the combined sample data and laboratory results. Sample indicators 402 are shown in the predefined field or location and information relating to the samples can be displayed in an information field or area 404. The sample indicator can incorporate specific analysis information into the sample indicator depending on the type of information to be displayed. For example, the sample indicator can include the specific value of a particular element at that sample point as determined by the analysis. The system can also extrapolate data using the sample data to provide the user with information regarding expected values of the analysis data over the entire area of the predefined field or location. In other words, the system can estimate the value of a parameter at a specific location in the predefined field or location using the analyzed values of the parameter from the sample points that surround the specific location.

In FIG. 6, a web page 600 can display a map 304 with the predefined field or location 306 showing a recommendation plan or prescription. The prescription or recommendation plan 602 for the predefined field or location 306 can be shown with respect to the predefined field or location 306. The prescription or recommendation plan 602 can include zones indicated differently that require different treatment options or equipment configurations. Information relating to the prescription plan can be displayed in an information field or area 604.

FIG. 7 shows an exemplary embodiment of the tracking of the progress of a piece of equipment relative to a transmitted prescription or recommendation plan. A web page 700 can display the progress of the piece of equipment in completing a transmitted prescription or recommendation plan for a predefined field or location 702. The transmitted prescription or recommendation plan for the predefined field or location 702 is shown with respect to the predefined field or location 702 and can include zones 704 that require different treatment options or equipment configurations. The transmitted prescription or recommendation plan can include information regarding the particular equipment setup for each of the zones 704 of the transmitted prescription or recommendation plan. As the piece of equipment enters a particular zone, the information from the transmitted prescription or recommendation plan can be automatically applied to the piece of equipment to adjust the operating configuration of the piece of equipment to that required for the new zone. In another embodiment, the transmitted prescription or recommendation plan can trigger an alert for the operator to manually adjust the configuration for the piece of equipment when the equipment is approaching a new zone.

The piece of equipment can include a GPS device to determine the location of the piece of equipment relative to the predefined field or location 702. An equipment indicator 706 can be shown to indicate the position of the piece of equipment relative to the predefined field or location 702. Further, the area 708 of the predefined field or location 702 where the transmitted prescription or recommendation plan has already been applied, i.e., the required action or task from the prescription or recommendation plan that has been completed, can be shown. When the piece of equipment has finished with the transmitted prescription or recommendation plan, the piece of equipment can send information to the agricultural field data system with the amount of material actually applied (using measured data from corresponding sensors) for particular locations (using information from the GPS device). The agricultural field data system can then provide the actual applied amount information to the user.

In one exemplary embodiment, agricultural field data can include one or more of soil samples, tissue samples from crops and nematode samples. It is to be understood that the collection of a particular sample is performed with the appropriate equipment necessary to obtain a viable sample for subsequent analysis.

In one exemplary embodiment, the agricultural field data system can communicate with the user, the operator, the piece of equipment or the laboratory by any suitable wireless communication technique. For example, the system can communicate through cellular communication technology or satellite communication technology. It is to be understood that the pieces of equipment incorporate the appropriate hardware, e.g., transmitters, receivers, amplifiers, etc., and/or software to enable effective communication for the wireless technology implemented in the piece of equipment.

In one exemplary embodiment, the user computer, operator computer, laboratory computer and equipment computers can include the appropriate user interfaces, monitors, displays or other associated equipment or software to enable a user or operator to interact with the equipment monitoring system.

Embodiments within the scope of the present application include program products having machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

Having thus described the invention, what is claimed as new and desired to be secured by Letters Patent is:

1. A system comprising:
   a first computer;
   a second computer associated with a piece of equipment at a remote location from the first computer;
   a third computer associated with a laboratory; and
   a field data management system comprising:
      a first computer algorithm executable by a microprocessor from the first computer, the first computer algorithm operates to permit a user to create a sampling workorder for a predetermined location and transmit the sampling workorder to the second computer;
      a second computer algorithm executable by a microprocessor from the second computer, the second computer algorithm operates to store log data associated with a collection of samples from the sampling workorder and transmit log data associated with the collection of samples to the first computer and the third computer;
      a third computer algorithm executable by a microprocessor from the third computer, the third computer algorithm operates to transmit analysis information relating to the collection of samples to the first computer;
      the first computer algorithm operates to combine the log data and the analysis information for the collection of samples with respect to the predetermined location;
      the first computer algorithm operates to permit a user to prepare a prescription plan for the predetermined location using the combined log data and analysis information and wirelessly transmit via cellular or satellite communication technology the prescription plan to the second computer;
      the second computer algorithm operates to store application data associated with the execution of the prescription plan and to wirelessly transmit via cellular or satellite communication technology the application data to the first computer;
      the first computer algorithm operates to permit a user to monitor a status of the predetermined piece of equipment in completing the prescription plan;
      the first computer algorithm operates to display the prescription plan for the predetermined location on a map;
      the first computer algorithm operates to permit a user to access analysis information on a sample associated with the collection of samples by selecting an indicator corresponding to the sample, the indicator being displayed on a map of the predetermined location;
      the first computer algorithm operates to display on a map the combined log data and analysis information with reference to the predetermined location; and
      the sampling workorder is directed to collecting at least one of soil samples, tissue samples or nematode samples at the predetermined location.

* * * * *